R. H. CLARKE.
STEREOTAXIC APPARATUS.
APPLICATION FILED JUNE 27, 1914.

1,129,333.

Patented Feb. 23, 1915.
4 SHEETS—SHEET 1.

FIG. 1.

WITNESSES:
George Du Bon
R. Aberley

INVENTOR
Robert H. Clarke
BY
Bresen Knauth
ATTORNEYS

R. H. CLARKE.
STEREOTAXIC APPARATUS.
APPLICATION FILED JUNE 27, 1914.

1,129,333.

Patented Feb. 23, 1915.
4 SHEETS—SHEET 2.

WITNESSES:

INVENTOR
Robert H. Clarke

ATTORNEYS

R. H. CLARKE.
STEREOTAXIC APPARATUS.
APPLICATION FILED JUNE 27, 1914.

1,129,333.

Patented Feb. 23, 1915.

WITNESSES:
George Du Bon
R. Aberli

INVENTOR
Robert H. Clarke
BY
ATTORNEYS

R. H. CLARKE.
STEREOTAXIC APPARATUS.
APPLICATION FILED JUNE 27, 1914.

1,129,333.

Patented Feb. 23, 1915.
4 SHEETS—SHEET 4.

WITNESSES:
George DuBon

INVENTOR
Robert H. Clarke
BY
ATTORNEYS

UNITED STATES PATENT OFFICE.

ROBERT HENRY CLARKE, OF OAKFIELD, WARLINGHAM, ENGLAND.

STEREOTAXIC APPARATUS.

1,129,333.      Specification of Letters Patent.      Patented Feb. 23, 1915.

Application filed June 27, 1914. Serial No. 847,595.

*To all whom it may concern:*

Be it known that I, ROBERT HENRY CLARKE, a subject of the King of Great Britain, and resident of "Oakfield," Warlingham, in the county of Surrey, England, have invented certain new and useful Improvements in Stereotaxic Apparatus, of which the following is a specification.

This invention relates to so-called stereotaxic apparatus of the kind described in the specification of my former application for Letters Patent Serial No. 779452, and also to stereotaxic surgical apparatus of the kind described in the specification of former Letters Patent granted to me No. 1,093112.

The object of the stereotaxic apparatus first referred to above is to gage the position of, and direct access to, any predetermined point within a so-called "solid" constituted by an inclosed space the relative positions of whose contents (which may be invisible from outside) are known with concurrent reference to three mutually-perpendicular assumed planes which, for the sake of convenience, are termed the "zero-planes" of the solid.

The stereotaxic apparatus in question comprises two distinct but fundamentally similar appliances, namely, a so-called "indicator", and a so-called "operative instrument" of essentially identical constitution; the first of these serving as a means of exhibiting a mechanical representation of the position of the predetermined point within the solid and of the means of access thereto by the second, or operative instrument, while the latter, with the aid of the indications thus afforded by the first, enables the predetermined point to be actually reached within the solid itself.

The stereotaxic indicator, as described in the before-mentioned specification Serial No. 779452, comprises screens respectively corresponding to the several assumed zero-planes of the solid; a so-called "index-point" adjustably mounted to afford a mechanical representation of the position, relatively to the respective screens, which the predetermined point occupies within the solid relatively to the zero-planes of the latter; a so-called "finder" constituted by a pointed and longitudinally-slidable straight rod for denoting the direction of the path of access to the index-point (and therefore also to the predetermined point of the solid itself); and means for so adjustably supporting the finder in a plane making any desired angles with the respective screens as to permit of the finder-axis extending, in the required direction, in alinement with the index-point in order that, by a simple longitudinal movement of the finder, its pointed extremity may be brought into contact or coincidence with the index-point.

The screens of the indicator extend in, or serve to represent, so-called "indicator-planes" respectively corresponding, in the indicator, to the zero-planes of the solid, and also constitute scales whereby to measure the ordinates for determining the position of the index-point with concurrent reference to the respective indicator-planes, in accordance with the known ordinates which determine the position of the predetermined point within the solid with concurrent reference to the respective zero-planes of the latter. For this purpose each screen presents in one plane a series of parallel equi-distant straight lines constituting a uni-directional scale; two arrangements being described in the specification in question. In one arrangement, the three screens are each of the "gridiron" type and respectively occupy three mutually-perpendicular planes, the lines of each screen extending perpendicularly with reference to those of both the other screens. In the other arrangement only one of the screens is of the gridiron type, while the other, which occupies a plane perpendicular to that of the single gridiron screen, is reticulated, that is to say consists in effect of such a combination of two gridiron-screens as to constitute a duo-directional scale; for which purpose this reticulated screen presents, in substantially one plane, two series of parallel equi-distant straight lines whereof those of the one series cross those of the other series at right angles, the lines of one series being parallel to those of the single gridiron-screen.

It is to be understood that the solid is conceived of as divided-up into three mutually-interpenetrating series of lamellæ of uniform unit-thickness, successive lamellæ of each series being separated from one another by equidistant imaginary planes parallel to one of the zero-planes so that, in effect, the solid is regarded as built up of juxtaposed unit-cubes of uniform unit-dimensions, the opposite faces of each cube being constituted by corresponding portions of a pair of adjacent lamellar surface-planes. This being so, the tri-dimensional position of the predetermined point with reference to the three zero-planes of the solid can be determined by concurrent reference to three series of charts which severally represent the individual lamellæ of the three mutually-interpenetrating series whereof the solid is regarded as being composed. Now, the distance apart of the lines of any one series in the screens of the indicator is equal to, or represents, the unit-thickness of the corresponding series of lamellæ in the solid itself, so that the three series of lines presented by the screens afford a representation of the assumed lamellar structure of the solid. Hence, the position of the predetermined point having been found in one chart of each of the three series of charts, the index-point of the indicator can, by means of the lines, be set in a position, relatively to the respective screens, corresponding to the position demarcated by the point of mutual interpenetration of the three individual lamellæ represented in the respective charts wherein the predetermined point has been found. It is to be observed, however, that different specimens of natural objects of the same class (for example, the heads of different animals of the same species), although of generally similar configuration, may differ from one another in the scale of their absolute dimensions, whereas it is advisable that the number of assumed lamellæ in a series should remain constant for all objects of the same class. Hence it follows that the lamellæ composing the object under treatment may, in the case of any one or all of the series of lamellæ, differ in actual thickness from the standard unit-thickness which it is generally convenient should be represented on the charts. It may therefore be necessary to vary correspondingly the distance apart of the parallel equidistant straight lines presented by any one or all of the screens of the indicator, and means for enabling such variation to be effected are described in specification Serial No. 779452.

In the form of indicator described in the specification just referred to, the means for adjustably supporting the finder comprise an externally rectangular open cage (or so-called "cubical frame") adapted to be erected about the screens, the virtual bounding-planes of the frame being parallel to the indicator-planes represented by the respective screens; a rectangular stage adapted to be detachably fixed upon the top or upon either of the sides of the cubical frame alternatively, according to requirements; a compound slide-rest carried by the stage and adapted to afford concurrent rectilinear adjustments in two directions at right angles to one another in a plane parallel to that bounding-plane (of the cubical frame) parallel to which the stage is fixed, the directions of such adjustments being respectively parallel to two adjacent edges of said bounding-plane; a so-called pillar mounted upon the upper or outer member of the compound slide-rest; and a socket or guide for the finder, carried by and angularly adjustable upon the pillar. The arrangement is such that the finder-axis may be adjusted to extend at any desired angle and in any desired direction with reference to that bounding-plane of the cubical frame on which the stage is fixed (and therefore with reference to the screens of the indicator), so as to enable the finder to be projected through its socket, by a single movement lengthwise of its own axis, until the pointed extremity of the finder is brought into contact or coincidence with the "index-point". When this has been done, the various adjustments which have been made in the indicator are ascertained by means of scales carried by the several parts, and these adjustments, being recorded, can be reproduced at will.

The stereotaxic operative instrument described in the same specification corresponds in all essential features to the stereotaxic indicator, so far as regards the cubical frame, the stage, the compound slide-rest, the pillar, the finder-socket, and the finder; the last-named, however, having its equivalent in any convenient form of tool (or so-called "probe") capable of being directed into the interior of the solid by movement lengthwise of its own virtual axis. Hence, if the cubical frame of the operative instrument be adjusted and fixed in such position about the solid as to insure that the assumed zero-planes of the solid shall occupy the same positions relatively to the bounding-planes of the cubical frame of the operative instrument as the screens (or the indicator-planes which they represent) occupy relatively to the bounding-planes of the cubical frame of the indicator, then, upon the several adjustments already made in the indicator, for the purpose of bringing the finder-axis into alinement with the index-point, being reproduced in the operative instrument (which for this purpose is provided with scales corresponding to those whereby the adjustments of the indicator were ascertained), the probe may be projected, from a zero-position corresponding to the zero-position of the finder, to a distance answering to the corresponding movement already performed by the finder, with the result that the probe will penetrate the solid until its extremity comes to rest at the predetermined point therein.

The stereotaxic surgical apparatus described in Patent No. 1,093,112 constitutes a particular form of the stereotaxic operative instrument just mentioned, and is designed for use in performing operations within the crania of living human beings or animals, or in anatomical research, by enabling a so-called probe (*i. e.* a needle-like, longitudinally-slidable instrument, serving as the means of carrying and controlling the actual operative device) to reach, with absolute precision and by the shortest path, any predetermined point within the cranium through a comparatively small opening formed in the wall of the latter; the primary object of the invention being to obviate the necessity of extensively laying open or partially dissecting the head and removing considerable portions of the cranial contents in order to gain access to the exact spot whereat the actual operation is required to be carried out. This surgical apparatus, as described in the specification above mentioned, comprises (in addition to the cubical frame, the stage, the compound slide-rest, the pillar, and the means for adjustably supporting the probe-socket on the pillar) a particular construction of one form of probe together with a suitable carrier therefor, and also a particular construction of head-vise for adjustably fixing the cubical frame in proper position upon the head to be operated upon.

The head-vise, which constitutes a substantially rectangular horizontal frame, comprises a pair of lateral bars extending parallel to one another and to the corresponding upper lateral members of the cubical frame which, as a whole, is planted upon the head-vise so that its position is determined by that of the vise, whose lateral bars are adjusted to extend in (or parallel to) the so-called horizontal zero-plane of the cranium. These lateral bars serve for carrying a pair of so-called ear-cones whose common axis coincides with the interaural axis (of the subject) wherein the horizontal and so-called frontal (or transverse vertical) zero-planes of the cranium intersect one another perpendicularly; the head-vise being adjusted upon the head so that the so-called sagittal zero-plane (or median longitudinal vertical plane) of the cranium coincides with the median longitudinal vertical plane of the head-vise and cubical frame. The lateral bars of the head-vise also carry the so-called mask or bridle, comprising a mouth-bit and a pair of hooks for insertion in the respective orbits of the subject, the mouth-bit and orbital hooks being adjustable for the purpose of securing the head-vise in such position that its lateral bars are immovably held parallel to the horizontal zero-plane of the cranium. Upon the lateral bars are also adjustably mounted two pairs of so-called head-cramps, respectively anterior and posterior, for gripping the cranium (for the sake of greater security) from the sides at points in front of and behind the inter-aural axis; while a so-called occipital bar, which connects together the lateral bars of the head-vice toward their rear ends, is adjustable lengthwise of the bars for the purpose of taking a bearing against the rear of the cranium if such additional support be found desirable. This occipital bar coöperates with a so-called nasal bar (which connects the side-bars at their front ends) in maintaining the side-bars in proper relation to one another and in forming, with the side-bars, a rigid and self-contained rectangular frame.

On consideration of the above description of the stereotaxic indicator and stereotaxic operative instrument (surgical or other), it will be seen that the method adopted for adjustably supporting the finder or the probe (as the case may be) is subject to disadvantages inseparable from the use of the so-called cubical frame, rectangular stage, and compound slide-rest, inasmuch as the bars or members composing the frame and stage, being immovable, must in practice limit at various points the range of adjustment of the finder or probe, and must also interfere to some extent with freedom of access to the surface of the cranium or other so-called solid. The object of the present invention is to overcome these defects by a system of construction which shall eliminate the cubical frame, the stage, and the compound slide-rest, and afford a support for the finder or probe which shall not only possess the unrestricted range of adjustability characteristic of a "universal joint," but shall allow virtually complete freedom of access to the surface of the solid. Such an arrangement might, obviously, take various forms, and it is to be observed that the improved system of construction, in whatever form it may be embodied, is well adapted for providing a support capable of fulfilling the same function, and of serving as an integral part, in the indicator and in the operative instrument alternatively, thus not only enabling a material reduction to be effected in the quantity of apparatus required, but also minimizing the risk of error which is liable to occur when delicate adjustments already made in the one instrument have to be repeated in the other. That is to say, if a support adapted to carry the probe alone, and capable of affording free adjustment for the probe-axis in any direction at will, be provided with means whereby it may be fixed, first, in the required position relatively to the assemblage of screens in the indicator, and thereafter, in the corresponding position relatively to the device for holding the solid in proper position with reference to the apparatus, then it will be obvious that the probe itself may replace the finder, and that, after the index-point has been set in proper position relatively to the respective screens and the extremity of the probe itself has been adjusted in contact or coincidence with the index-point, the probe may be retracted in the direction of its own axis, and the assemblage of screens together with the index-point and their supporting-means having been withdrawn from the apparatus and replaced by the solid with its holding-device, the probe may then be advanced in the direction of its own axis so as to penetrate the solid until its extremity comes to rest at the spot whereat it was originally adjusted. It will be evident that, in such an arrangement, the guide-socket for the probe might be adapted to receive a finder for use in cases where for any reason it is preferred to use a finder (in place of the actual probe) in conjunction with the screens and index-point. A simple form of such universally-adjustable support for the guide-socket of the finder or probe consists of a jointed arm comprising two or more members united by universal joints and each capable of being telescopically adjusted as regards length, the guide-socket itself being attached to the free extremity of the arm by a universal joint while the opposite extremity of the arm is provided with means whereby it may be detachably secured in a predetermined position with reference, alternatively, to the base which carries the assemblage of screens and to the head-vise or equivalent device forming part of the surgical or other operative instrument.

For the sake of rigidity and steadiness in working, however, it is generally preferable to adopt a construction bearing some resemblance, as regards the mode in which the main adjustments are obtained, to the well-known so-called equatorial instrument employed in certain astronomical observations. Such a form of the apparatus may consist in the combination, on the one hand with the head-vise or equivalent portion of the frame of the operative instrument, and on the other hand with a rigid horizontal base-plate for the indicator having mounted upon it a reticulated screen and a gridiron-screen whereof the former extends in a horizontal and the latter in a vertical plane, each screen being provided with an index-needle which extends perpendicularly to and is movable over the surface of the screen so that the intersection (actual or virtual) of the respective index-needles may be brought to the required position of the index-point or star (all substantially as described in application Serial No. 779,452), of improved means for adjustably supporting the finder or probe; said means comprising an apertured turntable adapted to rotate in a horizontal plane and alternatively mounted either upon the base-plate of the indicator directly above the reticulated screen and in fixed relation to both the reticulated and the gridiron screen, or in a corresponding position on the head-vise or equivalent portion of the frame of the operative instrument, so as to occupy the same fixed relation with reference to the several zero-planes of the solid; a rectilinear and so-called tangential guide carried by the turntable so as to extend, tangentially thereof, in a plane parallel to the plane of rotation of the turntable; a segmental guide or bridge spanning the turntable and occupying a vertical plane which is intersected perpendicularly by the tangential guide, lengthwise of which the bridge is adjustable; a slide-block adjustable upon the bridge; a rectilinear (and so-called radial) guide pivoted to the slide-block so as to be angularly adjustable relatively thereto in a plane parallel to that of the bridge; and a guide-socket for the finder or probe (as the case may be), adjustable lengthwise of said radial guide so as to permit of the extremity of the finder or probe being brought into contact or coincidence with the index-point or star in the indicator or with the predetermined point in the solid as the case may be.

The various elements just mentioned are obviously capable of considerable modification as regards both the relative positions of the parts and their structural details, and a generally convenient form of the arrangement (which may be distinguished as the "equatorial" form of the stereotaxic apparatus) will now be described with reference to the accompanying drawings, which illustrate the invention as applied to an indicator and an operative instrument designed for use in surgical operations on the crania of small animals such as cats for example.

It will be observed that, in the drawings, the various parts which are capable of movement for purposes of adjustment are shown, for the sake of convenience, arranged in what may be called symmetrical or normal positions, from which positions it is obvious that they would, when in use, require as a rule to be displaced.

The rigid base-plate 11 of the indicator has a horizontal upper surface 12 in which a central aperture 13 is preferably provided. Directly above the aperture 13 are mounted the gridiron-screens which conjointly constitute the reticulated screen, all the threads of which extend in a horizontal plane. Of these horizontal screens, that gridiron-screen A whose threads $a$ run longitudinally (i. e. parallel to that median longitudinal vertical indicator-plane which corresponds to the sagittal zero-plane of the cranium,) comprises a pair of sway-bars 14, 15 pivoted to the base-plate at 16, 17 respectively, so as to be capable of angular adjustment in a horizontal plane for the purpose of varying as may be required the distance apart of the parallel threads $a$ which are stretched between the sway-bars. The vertical pivotal axes 16, 17 are in the middle of the length of the sway-bars 14, 15, and intersect the medial or zero thread $x$ of the screen A, so that this median thread will remain in the same position whatever the angular position of the sway-bars 14, 15, and may be regarded as constantly lying in, and representing on a horizontal plane, the sagittal indicator-plane, and therefore also the sagittal zero-plane of the cranium.

The front sway-bar 14 carries a slotted quadrant 18 concentric with the pivotal axis 16 of the bar, this quadrant having a pointer 19 movable over a segmental scale 20 on the base-plate, while 21 is a set-screw passing through the slot in the quadrant and entering a threaded hole in the base-plate 11 so as to serve for clamping the sway-bar in position after adjustment. Links (not shown) may be used to couple together the adjacent ends of the respective sway-bars 14, 15; these links extending parallel to the threads $a$ so as to constitute, together with the sway-bars themselves, a distortable parallelogrammatic frame. The other horizontal gridiron-screen, whose threads, closely underlying those of the screen A, run transversely (i. e. at right angles to the threads $a$ of the screen A, and therefore parallel to the frontal indicator-plane, so as to represent the frontal zero-plane of the cranium), is, in the example illustrated, and for a reason hereinafter explained, made duplex; that is to say it comprises two independent sections consisting of separate gridiron-screens $B^1$ and $B^2$ whose respective sets of threads $b^1$ and $b^2$ extend, parallel with one another, in the same horizontal plane so as to meet (actually or virtually) in a common zero-thread $y$. Of these sections $B^1$ is what may be termed the anterior transverse and $B^2$ the posterior transverse screen, the two sections extending respectively on opposite sides of the common zero-thread $y$ which has a constant and unalterable position and which may be regarded as constantly lying in, and representing on a horizontal plane, the frontal indicator-plane, and therefore also the frontal zero-plane of the cranium (i. e. that frontal or transverse vertical plane wherein lies the inter-aural axis).

The anterior screen $B^1$ comprises a pair of sway-bars 23, 24 pivoted to the base-plate 11 at 25, 26 so as to be angularly adjustable in a horizontal plane, the pivotal centers 25, 26 being at the rear or zero end of the sway-bars 23, 24 and the vertical pivotal axes intersecting the zero-thread $y$. Similarly the posterior screen $B^2$ comprises a pair of sway-bars 27, 28 pivoted to the base-plate at 29, 30 so as to be angularly adjustable in a horizontal plane, the pivotal centers 29, 30 being at the front or zero end of the sway-bars 27, 28 and the vertical pivotal axes also intersecting the zero-thread $y$.

The free ends of the sway-bars 23, 24 are coupled together by a link 31, and the free ends of the sway-bars 27, 28 are coupled together by a link 32; both links 31 and 32 extending parallel to the zero-thread $y$ so as to constitute, together with the corresponding sway-bars themselves, a pair of independently distortable parallelogrammatic frames. 33 is a slotted quadrant carried by the sway-bar 23 concentrically with the pivotal axis 25 and provided with a pointer 34 movable over a segmental scale 35 on the base-plate, while 36 is a set-screw for clamping the sway-bar in position after adjustment. Similarly, 37 is a slotted quadrant carried by the sway-bar 27 concentrically with the pivotal axis 29 and provided with a pointer 38 movable over a segmental scale 39 on the base-plate, while 40 is a set-screw for clamping the sway-bar in position after adjustment.

The reason for making the transverse horizontal screen in two independently adjustable sections which meet a common zero-thread $y$ lying in the frontal indicator-plane as described is, that in different animals of the same species, the relative proportions between the lengths respectively measured forward and rearward from the inter-aural axis is often found to vary so considerably as to render it advisable to treat the respective sets of frontal lamellæ, anterior and posterior, as of different unit-thickness. Moreover, as the anterior portion of the cranial cavity is, as a rule, longer than the posterior portion, and therefore requires a greater number of lamellæ to be represented in the charts, it will be observed that, in the example illustrated, the anterior transverse screen $B^1$ (which for convenience in manipulation is placed toward what may be regarded as the rear end of the indicator base-plate 11) is made wider and is provided with a greater number of threads than the posterior transverse screen $B^2$ (which is placed toward the front end of the base-plate).

Toward the rear end of the base-plate 11 is mounted the third or vertical screen C of the indicator, this screen extending in a transverse vertical plane parallel to the common zero-thread $y$ of the two sections $B^1$, $B^2$ of the transverse horizontal screen and wholly above and clear of the reticulated screen $AB^1 B^2$. The screen C, which is a gridiron-screen with its threads $c$ extending horizontally, comprises a pair of sway-bars 41, 42 pivoted at 43, 44 respectively, so as to be angularly adjustable in the vertical plane of the screen; the pivotal axes 43, 44 intersecting the zero-thread $z$ of the screen so that this thread, remaining constantly at the same level, may be regarded as constantly lying in, and representing on a vertical transverse plane, the horizontal indicator-plane and therefore also the horizontal zero-plane of the cranium (i. e. that horizontal plane wherein lies the inter-aural axis).

The sway-bars 41, 42 are pivoted to an upright removable frame 45; 46 being a pointer carried by the sway-bar 41 and movable over a segmental scale 47 provided on the frame 45 concentrically with the pivotal axis 43; while the adjustment of the screen C is fixed by means of a set-screw 48 carried by the sway-bar 42 and movable in a segmental slot 49 provided in the frame 45 concentrically with the pivotal axis 44.

50 is a link which couples together the upper ends of the sway-bars 41, 42 and extends parallel to the threads $c$ and $z$ so as to constitute, together with the sway-bars 41, 42 themselves, a distortable parallelogrammatic frame.

It will be observed that, in the example illustrated, the greater part of the depth of the screen C, and the majority of its threads $c$, are above the level of the zero-thread $z$; this arrangement being adapted for the sake of convenience in view of the fact that the greater part of the brain is situated above the level of the inter-aural axis.

As regards the adjustment of each of the screens (A, $B^1$ and $B^2$, and C), the arrangement should be such that for normal adjustment the sway-bars of a screen make an angle (say of 45 degrees) with the threads of the screen such as will permit of displacement in either direction with equal facility, so as to enable the distance apart of the threads to be either increased or diminished as may be found necessary in view of the actual dimensions found by gaging the cranium which is to be dealt with. A generally convenient normal or standard unit-distance apart for the threads is one millimeter, this distance corresponding to a generally convenient standard unit-thickness for the lamellæ represented in the charts. Assuming, therefore, that the cranium dealt with is gaged in millimeters and certain selected aliquot parts of a millimeter, any discrepancy between one of the leading dimensions of the cranium as gaged and the corresponding standard dimension as represented in the charts, will require to be compensated, in the corresponding screen, by an expansion or contraction, expressed in the same aliquot parts of a millimeter, of the distance separating the threads of the screen. To facilitate this adjustment, it is preferred to inscribe each of the segmental scales 20, 35, 39, and 47 with a mid or normal point and a series of graduations on opposite sides thereof corresponding to those angular adjustments of the sway-bars of the screen which will produce progressively equal increments or decrements, expressed in the selected aliquot parts of a millimeter, of the intervals between the threads of the screen.

The requisite tension may be maintained in the threads of each screen by any convenient means, such as, for example, one of the devices described in application Serial No. 779452.

Figure 1:
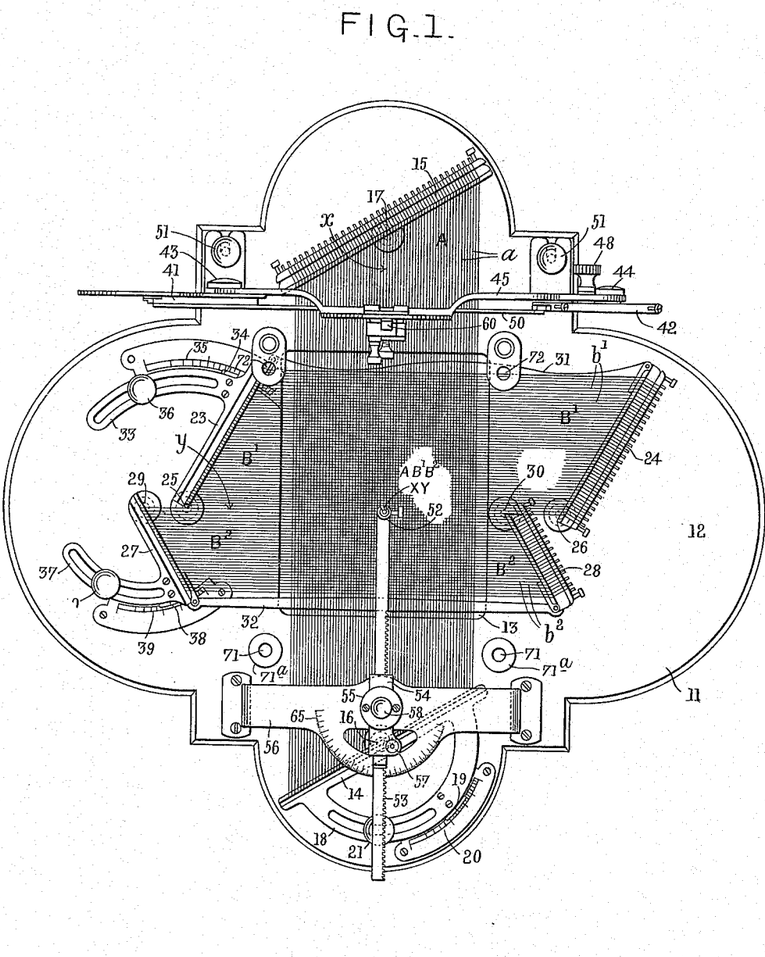
Figure 1 is a general plan view of the indicator, the turntable and parts carried thereby being omitted so as to afford a clear view of the horizontal screens.

It is to be observed that, in the example illustrated, the common zero-thread $y$ of the two horizontal screens $B^1$, $B^2$ is attached at its opposite ends to one sway-bar in each of the respective screens; that is to say, the zero-thread $y$ is stretched between the sway-bar 24 of the anterior screen $B^1$ (to which the thread is attached at a point coincident with the pivotal axis 26) and the sway-bar 27 of the posterior screen $B^2$ (to which the thread is attached at a point coincident with the pivotal axis 29), as will be seen on reference to Fig. 1. This arrangement assists in insuring the maintenance of the common zero-thread $y$ in correct position relatively to both screens $B^1$ and $B^2$.

The upright frame 45 is detachably secured upon the base-plate 11 by clamping-screws 51, it being usually convenient to remove this frame, together with the screen C which it serves to support, after the position of the index-point has been determined; such removal affording space for manipulating the turntable and the various parts carried thereby, without the necessity of making the instrument inconveniently bulky, as would otherwise be necessary in order to provide the requisite clearance. The frame 45, when replaced, may have its proper position accurately determined by any convenient means such for example as dowel-pins or stops.

Figure 6:
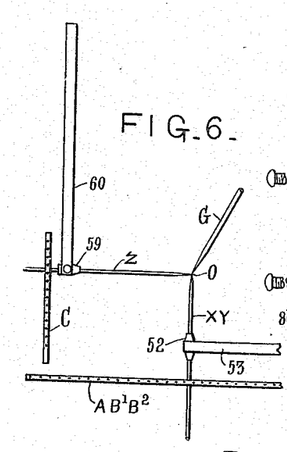
Fig. 6 is a diagrammatic side elevation, viewed as in Fig. 4, and designed to illustrate the use of the index-needles for determining the position of the index-point in the indicator.
Figure 7:
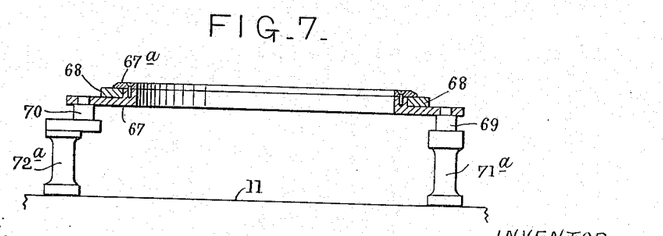
Fig. 7 is a vertical section of the turntable and its platform, shown separately as mounted in position in the indicator, the section being taken on line 7—7 of Fig. 2.

It will be evident that, with lamellæ of unit-thickness approximately equal to one millimeter, the position of any point within the cranium will be capable of being represented in the indicator with sufficient accuracy if the point be regarded as falling within a cubical space bounded by three mutually perpendicular pairs of adjacent lamellar surface-planes, the planes of a pair being represented by two successive charts in the corresponding series of charts. Hence the index-needles, employed as mechanical ordinates for determining or adjusting the position of the index-point or star in the indicator, may, instead of being applied only to the surface of the screens so as to contact with the threads themselves, be permitted to pass between the threads which represent the selected pair of adjacent lamellar surface-planes. By this means it is possible to determine the position of the index-point (or star) O by the mutual contact of the acute extremities of two index-needles XY and Z of indefinite length, whereof the needle XY is vertical and passes from beneath upward through the aperture 13 in the base-plate 11 and through the selected rectangular space or cell in the horizontal reticulated screen $AB^1B^2$, while the needle Z is horizontal and passes from behind forward through the open frame 45 and between the selected pair of threads in the vertical gridiron-screen C, as shown in Fig. 6.

The vertical index-needle XY is adjustable vertically (i. e. in the direction of its own length) in a crosshead 52 on the end of a rack-bar 53 which, extending in a horizontal plane above the screen $AB^1B^2$, is adjustable lengthwise through a guide 54 provided in a capstan 55 mounted to turn about a vertical axis carried by a bridge 56 which is fixed to the base-plate 11 so as to straddle over the screen A. The pinion (not shown) which engages the teeth on the rack-bar 53 is turned by means of a milled head 57, while both the longitudinal adjustment of this rack-bar and the angular adjustment of the capstan 55 are capable of being rendered permanent by means of a single clamping-screw 58 concentric with the capstan. Similarly, the horizontal index-needle Z is adjustable horizontally (i. e. in the direction of its own length) in a crosshead 59 on the end of a rack-bar 60 which, extending in a vertical plane in front of the screen C, is adjustable lengthwise through a guide 61 provided in a capstan 62 mounted to turn about a horizontal axis carried by the frame 45. The pinion (not shown) which engages the teeth on the rack-bar 60 is turned by means of a milled head 63, while both the longitudinal adjustment of this rack-bar and the angular adjustment of the capstan 62 are capable of being rendered permanent by means of a single clamping-screw 64 concentric with the capstan.

The rack-bars 53 and 60 may be scale-marked to indicate the distance to which they are projected through their respective guides 54 and 61, while the angular adjustment of the capstans 55 and 62 may be ascertained by means of quadrant-scales as indicated respectively at 65 and 66.

In the drawings, the index-point O in the indicator is represented (in Figs. 4 and 6) only by the mutual contact of the two index-needles XY and Z, but it will be obvious that if it should be desired to remove these needles out of the way, the index-point O, when once its position has been determined with the aid of the needles, might be represented by a star (constituted, for example, by a small wire cross as described in application Serial No. 779,452) supported in any convenient manner, the central point of the star denoting the true position of the index-point.

Figure 2:
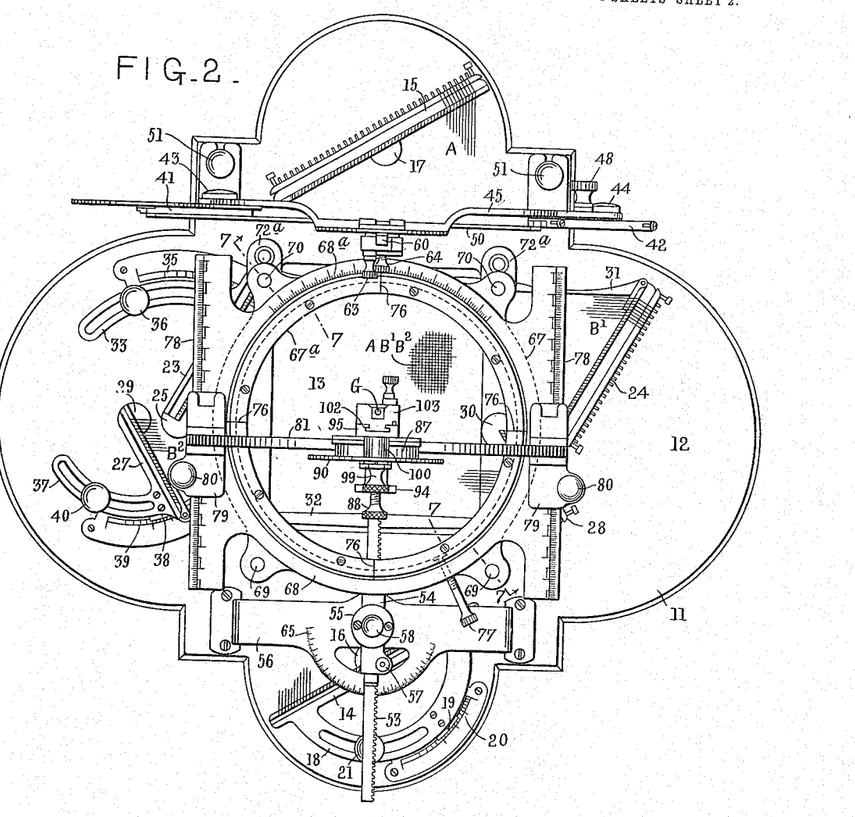
Fig. 2 is a view similar to Fig. 1, showing the turntable and parts carried thereby in position, but with the threads of the horizontal screens broken away for the sake of clearness.
Figure 8:
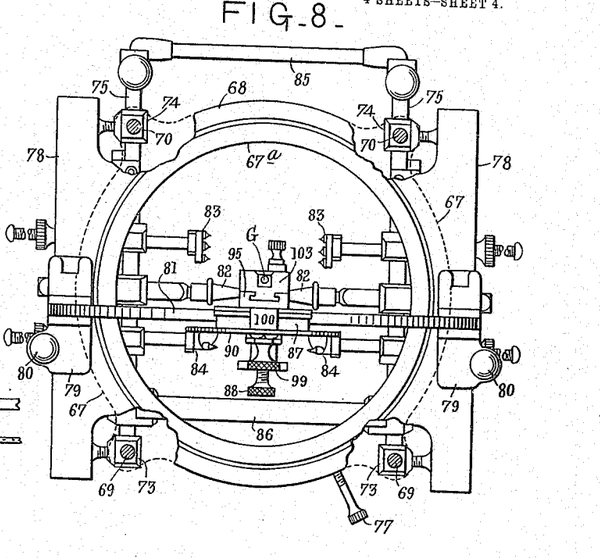
Fig. 8 is a plan view of the turntable and parts carried thereby, mounted on the head-vise of the operative instrument and with parts broken away for the sake of clearness, this view being on a slightly larger scale than the other drawings.

The turntable with its appurtenances, which, as already stated, is capable of being alternatively mounted either (as shown in Fig. 2) upon the base-plate of the indicator or (as shown in Fig. 8) upon the head-vise of the operative instrument, comprises, in the example illustrated, a stationary platform 67 forming the base of the turntable and provided with a circular horizontal guide whereon the turntable (properly so called) 68 is fitted to revolve, the platform 67 and turntable 68 having concentric circular apertures of the greatest practicable diameter. The angular adjustment of the turntable relatively to the platform may be determined by means of a pointer or pointers 76 provided on the circular limb $67^a$ of the platform 67, under which moves a graduated arc $68^a$ on the turntable 68, while this adjustment may be rendered permanent by means of a clamping-screw 77.

The platform 67 is furnished with four feet, in two pairs 69 and 70, symmetrically disposed with reference to what may be termed the longitudinal diameter of the platform, this longitudinal diameter lying in a plane which is made to coincide with the sagittal zero-plane in the indicator and in the operative instrument alternatively. Each of these four feet preferably consists, as shown, of a vertical cylindrical plug or pintle, the front pair 69 and the rear pair 70 being respectively adapted to fit alternatively either, on the one hand, into corresponding front and rear pairs 71 and 72 of sockets provided in pairs of pillars 71ª and 72ª upstanding from the base plate 11 of the indicator in positions disposed symmetrically with reference to the zero-thread $x$ of the screen A (see Fig. 1), or, on the other hand, into corresponding front and rear pairs of similar sockets provided in pairs of blocks 73 and 74 mounted on the lateral bars 75 of the head-vise of the operative instrument (see Fig. 8) in corresponding positions disposed symmetrically with reference to the median longitudinal vertical plane of that instrument and therefore of the cranium when the latter is fixed in position in the head-vise.

It is to be observed that the level at which the turntable is supported in the indicator relatively to the zero-thread $z$ of the screen C, must correspond to the level at which the turntable is supported in the operative instrument relatively to the horizontal zero-plane of the cranium, as represented by (say) the upper surface of the lateral bars 75 of the head-vise.

Upon the turntable 68, in positions diametrically opposite to one another, are provided a pair of straight parallel horizontal guide-rails 78 which extend, tangentially with reference to the circular opening in the turntable and its platform, to any convenient distance on opposite sides of that diameter of the turntable which intersects both of said rails at right angles. Both guide-rails 78 are correspondingly scale-marked (as indicated in Fig. 2), and upon the respective rails are fitted to slide a pair of slippers 79 whose adjustment lengthwise of the rails may be rendered permanent by means of clamping-screws 80. The slippers 79 constitute feet fixed on the respective ends of a segmental bar forming a bridge 81 which extends upward in a vertical plane so as to span the interval between the guide-rails 78 and therefore also the opening in the turntable and platform.

The horizontal axis about which the bridge 81 is curved constantly intersects the vertical axis about which the turntable is rotatable, whatever the angular adjustment of the turntable 68 relatively to its platform 67; this horizontal axis being situated, in the indicator, at a definite level relatively to the zero-thread $z$ of the screen C (say, at the level of the horizontal screens A, B¹, B²), and therefore also, in the operative instrument, at a corresponding level relatively to the horizontal zero-plane of the cranium, as represented by (say) the upper surface of the lateral bars 75 of the head-vise. Moreover, it is to be observed that the vertical axis about which the turntable is rotatable coincides with the perpendicular which on the one hand, in the indicator, passes through the two horizontal zero-threads $x$ and $y$ at their point of virtual intersection, and which on the other hand, in the operative instrument, passes centrally through the inter-aural axis as determined by the ear-cones 82 which are supported by the lateral bars 75 of the head-vise.

In Fig. 8, 83 represent the anterior pair of head-cramps, and 84 the posterior pair, both of which are adjustably mounted on the lateral bars 75 of the head-vise; while 85 is the nasal bar and 86 the occipital bar whereby the lateral bars 75 are rigidly connected together to form a rectangular horizontal frame; all these parts being understood to be constructed and arranged substantially as described in Patent No. 1,093,112. In Fig. 8 the scale-markings are omitted in the case of both the head-vise and the turntable.

Figure 3:
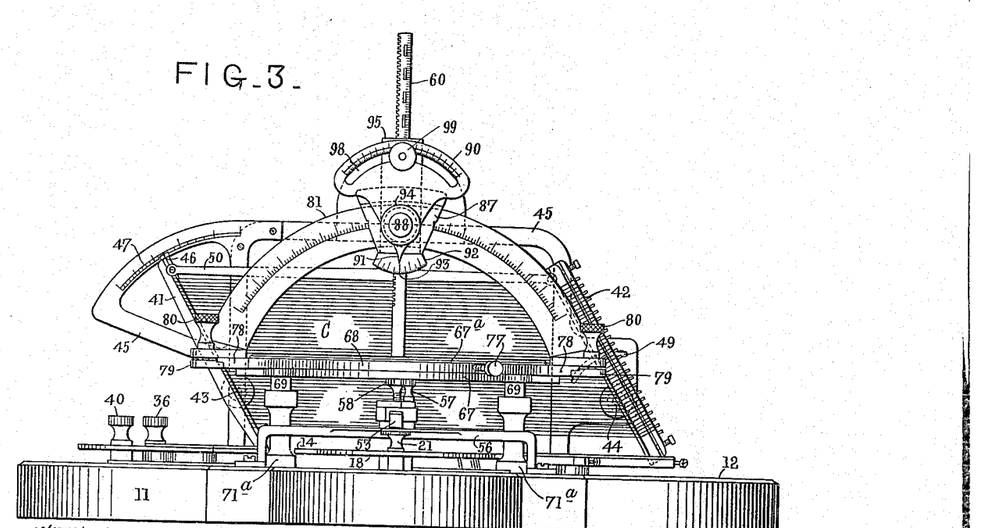
Fig. 3 is an elevation of the indicator as seen when viewed from the lower part of Fig. 2.
Figures 4, 9, 10:
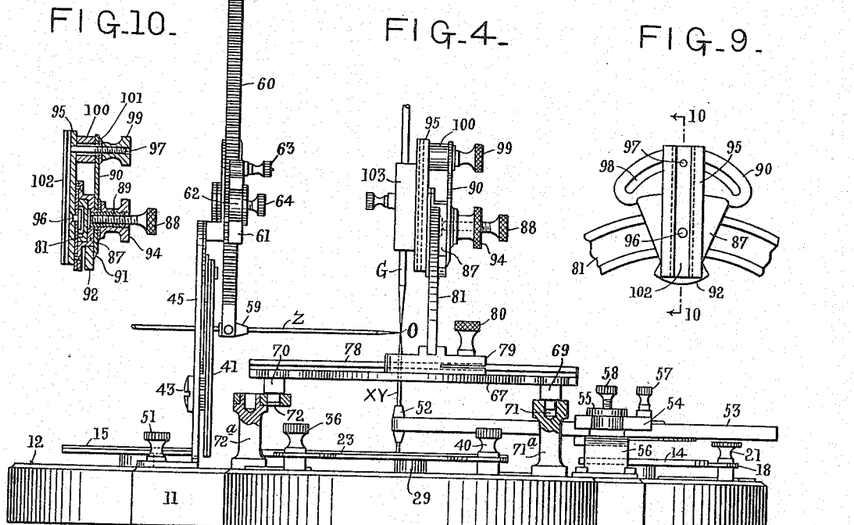
Fig. 4 is an elevation of the indicator as seen when viewed from the left-hand side of Fig. 2.
Fig. 9 is a face view of the slide-block and associated parts for carrying the finder or probe on the bridge of the turn-table.
Fig. 10 is a section on line 10—10 of Fig. 9.
Figure 5:
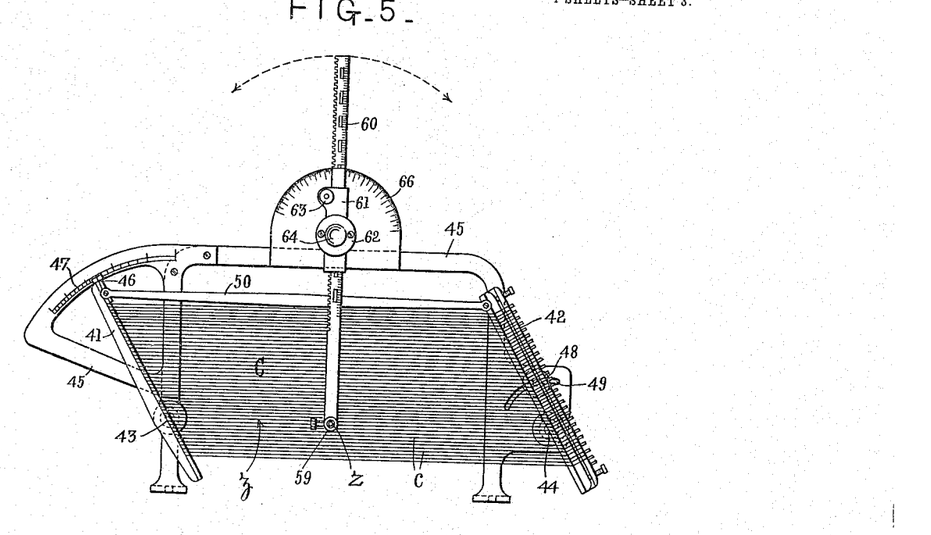
Fig. 5 is an elevation of the upright screen of the indicator, viewed as in Fig. 3, but shown separately.

The means whereby the finder or the probe (as the case may be) is adjustably mounted on the bridge 81 are as follows (see Figs. 3, 4, 9 and 10). A slide-block 87, embracing and adjustable lengthwise of the bridge, is adapted to be clamped thereto by means of a set-screw 88 which passes through a tubular socket 89 (see Fig. 10) fixed to and projecting from the slide-block at right angles to the plane of the bridge 81; the bridge being graduated (as indicated in Fig. 3) on that face at which the socket 89 and set-screw 88 are situated. On the same face of the slide-block, a quadrant 90 is mounted so as to be angularly adjustable about the socket 89 in a plane parallel to that of the bridge; the quadrant 90, which extends above the socket and bridge, being provided at its lower part, beneath the level of the socket, with a pointer 91 whereby the quadrant may be set so that its radial center-line extends either normally with reference to the curvature of the bridge as in Figs. 3 and 9, or at any desired inclination to the bridge-radius passing through the socket 89. For this purpose the lower part 92 of the slide-block 87, over which the pointer 91 is movable, is formed as a quadrant which bears a central mark 93 (Fig. 3) coincident with the bridge-radius passing through the axis of the socket; and if desired this part 92 of the slide-block may bear graduations on each side of the central mark 93, as indicated. A nut 94, screwing on the threaded outer surface of the socket 89, serves to clamp the quadrant 90 in the angular position (about the socket-axis) to which it is set. On the opposite face of the slide-block 87, a rectilinear guide-socket 95 for the carrier of the finder or probe (as the case may be) is mounted so as to be angularly adjustable, in a plane parallel to that of the bridge 81, about a pin 96 fixed in the slide-block; this guide-socket 95, which extends above the bridge, carrying at its upper end a screw-threaded stud 97 which projects through a segmental slot 98 in the quadrant 90 and receives, at the farther side of the latter a nut 99 whereby to fix the angular adjustment of the guide-socket 95 by clamping the quadrant 90 between said nut and a shoulder or stop 100 provided on the back of the guide-socket concentrically with the stud 97. The quadrant 90 is graduated (see Fig. 3) along the margin of the slot 98; a pointer provided on a washer 101 (see Fig. 10), which is interposed between the quadrant and the nut 99, moving (with the angular adjustment of the guide-socket 95) over the graduations. The guide-socket 95 is grooved as at 102 for the reception of the carrier for the finder or probe, this carrier being understood to be adjustable lengthwise of the groove and provided with means whereby it may be clamped therein after adjustment. In Figs. 2, 4, and 8, the finder-carrier is shown at 103, while G represents the finder, which may itself be adjustable lengthwise in its carrier. The probe G is also shown in the diagram, Fig. 6.

It will be seen that the construction described affords the following adjustments for the finder or probe, namely:—(1,) horizontal angular adjustment, by means of the turntable 68, about the vertical axis of revolution thereof; (2,) horizontal rectilinear adjustment, by means of the tangential guide-rails 78, in a radial direction with reference to the turntable-axis; (3,) vertical angular adjustment, by means of the bridge 81, in a direction at right angles to the guide-rails 78 and concentrically with the bridge; (4,) vertical angular adjustment, by means of the quadrant 90, in a plane parallel to that of the bridge 81 but not concentrically with the latter; and (5,) rectilinear adjustment of the finder or probe in the direction of its own length.

Obviously, the carriers for the finder and probe respectively must be so constructed that the virtual axis of the probe, when the latter is substituted for the finder, shall coincide in position with the position previously occupied by the virtual axis of the finder. Moreover, both the guide-socket 95 and also the finder and the probe must be provided with scales or graduations (those for the finder and probe starting from identically-placed zero-points) whereby to determine, and maintain identity between, the longitudinal adjustments of the finder and of the probe respectively. These graduations are not shown on the drawings.

If desired, the level of the head-vise (or equivalent part of the operative instrument) relatively to the plane of the turntable may be made adjustable, means being provided in such case for correspondingly adjusting the level of the zero-thread $z$ in the indicator relatively to the same plane. In some cases it may be desirable to leave a gap in the circumference of the turntable and its platform, or to provide means for enabling a portion of the circumference to be removed so as to facilitate the application of the turntable to the cranium or other solid.

In connection with each adjustment, if deemed advisable, a tangent-screw device (with or without a vernier-scale) may be provided for enabling the adjustment to be completed with more minute accuracy after a coarse initial adjustment has been made, as in the theodolite and similar instruments of precision.

Where the turntable, together with the parts carried thereby, is designed for use in the indicator and operative instrument alternatively, it is obviously not essential that scales should be provided for ascertaining most of the adjustments, since, with one exception, these are not disturbed during the transference of the support from the indicator to the operative instrument. The exception referred to is the linear adjustment, in the direction of its own axis, of the probe, more especially when the latter itself is used instead of a separate finder; the reason being that the probe (which in the case supposed must obviously be retracted before the application of the apparatus to the solid itself) must be provided with a scale for enabling the extremity of the probe to be projected the ascertained distance into the solid. Where, however, the indicator and the operative instrument each form a complete self-contained apparatus, it is necessary that all the adjustable parts be provided with scales whereby to enable each adjustment effected in the indicator to be registered, and afterward repeated in the operative instrument.

In application Serial No. 779452 a construction for the indicator-screens was described wherein the threads of each screen are replaced by knife-edged metal bars serving to carry the index-needles, so that according as each screen is adjusted in order to vary the distance apart of the lines represented by the edges of the bars, so will the index-point, presented at the virtual intersection of the index-needles, automatically vary its position to a corresponding extent. A substantially similar construction is applicable in the case of the instrument illustrated in the drawings accompanying the present description, and is well adapted for enabling the indicator to be employed for the purpose of presenting what may be termed a diagrammatic model of any selected part, or even of the whole, of the interior of the cranium so as to facilitate the choice by the operator of such a path for the probe as shall be best suited to the requirements of the operation which it is desired to perform. That is to say, the horizontal reticulated screen (comprising the gridiron screens A, $B^1$ and $B^2$ as above described), if formed of bars as just mentioned, and provided with means for distorting the parallelogrammatic frames of the several constituent sections of the screen, may be made to serve as a base upon which to mount small upright pillars carrying at their upper ends distinctively-colored terminals representing leading points in the brain, these pillars being mounted on the intersections of those horizontal bars of the screens A and B¹ or B² which correspond to the positions of said points (relatively to the zero-threads $x$ and $y$) as represented on the appropriate charts of the sagittal and frontal laminæ respectively; while the heights of the terminals (relatively to the zero-thread $z$) are determined by reference to the appropriate charts of the horizontal laminæ. Series of terminals may then be connected by distinctively-colored elastic bands representing the boundaries, etc., of various tracts in the brain, the courses of nerve-tracks, blood-vessels, and the like, so that a model of the brain (or interior of the cranium), having any desired degree of completeness, may be afforded. This model, as initially constructed, will represent the conditions existing within a cranium of the standard dimensions exhibited in the charts, but when the cranium which is to be operated upon has been gaged so as to ascertain its actual dimensions, and when the various screens have been adjusted in accordance with the dimensions as thus gaged, the model will represent the conditions actually existing within the cranium under treatment, so far as it is possible to estimate those conditions without the dissection which it is the object of the invention to render unnecessary. The probe (or operative instrument to be introduced into the brain) can then be directed, in the indicator, to the point in the model corresponding to the point which it is desired to reach within the cranium, the most suitable path being readily selected, by direct inspection of the model, so as to pass through, or avoid (as circumstances may render advisable), any tract exhibited. When this has been done, the various adjustments of the turntable and parts carried thereby are fixed, the linear projection of the probe from its zero-point is registered, and the probe is retracted to a distance which will carry its point clear of the cranium. The head-vise being fixed in position about the cranium under treatment, the turntable, together with the probe, is transferred as a whole from the indicator to the corresponding position on the head-vise. and the probe having been advanced so as to mark the surface of the cranium, is temporarily removed. The cranium is thereupon trephined at the point thus indicated, and the probe is finally replaced in its guide-socket on the bridge of the turntable and advanced so as to penetrate the brain to the same distance as it was previously advanced in the model, and the operation can then be carried out.

In cases more particularly where it is unnecessary to make provision for varying the distance apart of the parallel equidistant straight lines presented by the screens of the indicator, the following very simple substitute for the screens may be adopted in place of the combination (described in application Serial No. 779452 and referred to above) of a reticulated screen and a gridiron screen, together with the adjustable index-point. In this simplified arrangement, the reticulated screen is represented by a card ruled with parallel equidistant straight lines in two series which cross one another at right angles, the card being mounted in predetermined position on a flat horizontal table fixed to the top of an upright rod which is adjustable in the vertical direction, but incapable of turning, in a guide provided with means for supporting the rod and table at any desired height. The vertical rod is scale-marked and thus serves the same purpose as the gridironscreen, the zero-level of the card and (say) the central line of each series of lines on the card being initially fixed so as to occupy, respectively, positions in the indicator-planes or zero-planes previously referred to. Assuming a point on the card to be chosen to represent the duo-dimensional position of the predetermined point within the solid, then, on the vertical scale-marked rod being raised or lowered so as to bring the card to a level corresponding to the distance of the predetermined point from the horizontal zero-plane, the selected point on the card will obviously be brought to the true tridimensional position of the predetermined point within the solid relatively to the respective zero-planes thereof.

Cards bearing lines ruled at different distances apart may readily be substituted one for another to suit different requirements, while the vertical rod, if made of square cross-section for example, may bear a series of correspondingly differing scales.

This simplified means of exhibiting the position of the predetermined point in the stereotaxic apparatus when the latter is used as the indicator, is specially suited for use in conjunction with that improved form of universally-adjustable support for the guide-socket of the finder or probe which was first described above, and in combination therewith constitutes a form of apparatus well adapted for use where such a comparatively inexpensive device is sufficient to meet practical requirements.

What I claim is:—

1. In a stereotaxic apparatus of the character described the combination of a guide-socket for a probe or the like, a support therefor, and means adapting the probe for universal adjustment angularly and longitudinally to bring the point thereof to any desired position, said means being concentrically disposed so as to permit free access to the point of the probe or to the solid to be operated upon.

2. In a stereotaxic apparatus of the character described including two base members provided with corresponding positioning elements, the combination therewith of a probe supporting member, provided with positioning elements adapted to coöperate with the positioning elements of either base member and comprising a base and a guide-socket for the probe or the like supported thereon, universally adjustable circumfertially and longitudinally for locating the point of the probe at any desired predetermined position.

3. In a stereotaxic apparatus of the character described including two base members provided with corresponding positioning elements, the combination therewith of a probe supporting member, provided with positioning elements adapted to coöperate with the positioning elements of either base member and comprising a base having a circular opening therein, a correspondingly apertured turn-table concentrically and revolubly mounted thereon, a support adjustably secured to and extending above said table and a guide-socket for the probe or the like adjustably mounted upon said support whereby the probe or the like is universally adjusted to locate the point thereof at any desired predetermined position, the central opening in the base and table permitting ready access to the point of the probe or to the body being operated upon.

4. In a stereotaxic apparatus of the character described including two base members provided with corresponding positioning elements, the combination therewith of a probe supporting member, provided with positioning elements adapted to coöperate with the positioning elements of either base member and comprising a base having a circular opening therein, a correspondingly apertured turn-table concentrically mounted thereon to rotate in a horizontal plane, a rectilinear guide carried by the turn-table so as to extend tangentially thereof in a plane parallel to the plane of rotation of the turn-table, a segmental bridge spanning the turn-table and occupying a vertical plane which is intersected perpendicularly of the tangential guide, lengthwise of which said bridge is adjustable, a slide block adjustable upon the bridge, a rectilinear guide pivotally mounted upon said slide block, and guide socket adapted to carry a finder or probe adjustably mounted in said guide, substantially as shown and described.

ROBERT HENRY CLARKE.

Witnesses:
BERTRAM R. J. BEW,
JAMES HENRY BOYD.

Copies of this patent may be obtained for five cents each, by addressing the "Commissioner of Patents, Washington, D. C."